United States Patent
Ruhland et al.

[15] 3,683,991
[45] Aug. 15, 1972

[54] IMPROVED TIRE BEAD SEATER
[72] Inventors: Felix H. Ruhland, Osseo; Raymond H. Schmidt, Buffalo, both of Minn.
[73] Assignee: Solar Industries Inc., Osseo, Minn.
[22] Filed: Feb. 11, 1971
[21] Appl. No.: 114,544

[52] U.S. Cl. ................................................. 157/1.1
[51] Int. Cl. ..................................................B60c 25/06
[58] Field of Search ......................................157/1.1

[56]     References Cited

UNITED STATES PATENTS

| | | | |
|---|---|---|---|
| 3,552,469 | 1/1971 | Corless | 157/1.1 |
| 2,900,015 | 8/1959 | Harrison | 157/1.1 |
| 2,461,938 | 8/1969 | Mueller | 157/1.1 |

Primary Examiner—Granville Y. Custer, Jr.
Attorney—Merchant & Gould

[57]     ABSTRACT

An arcuate housing defining a plenum with a valve for attaching a source of air under pressure thereto and jets in communication with said plenum forming a plurality of jets of air and directing the jets of air so they will enter the space between the bead of a tire and the upper rim when the housing is coaxially positioned adjacent the rim. The high velocity jets of air raise the pressure within the tire quickly to a value sufficient to seat the bead on the rim while the jets compose substantially less than a continuous circle.

8 Claims, 10 Drawing Figures

PATENTED AUG 15 1972 3,683,991
SHEET 1 OF 2
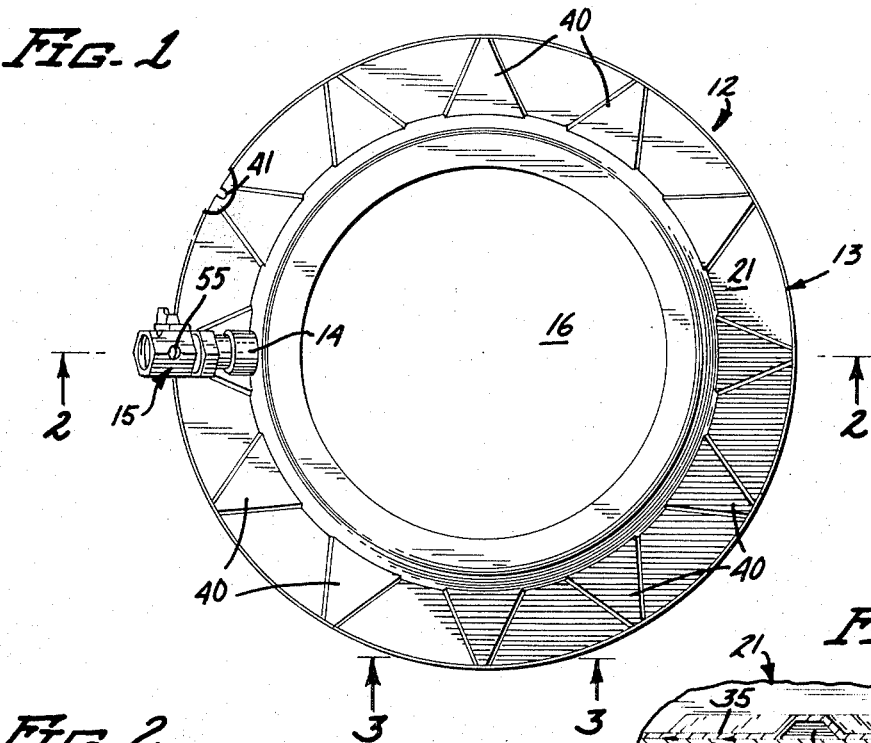
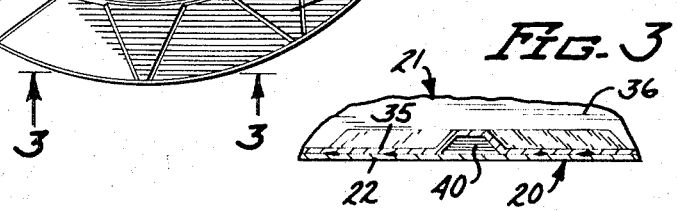
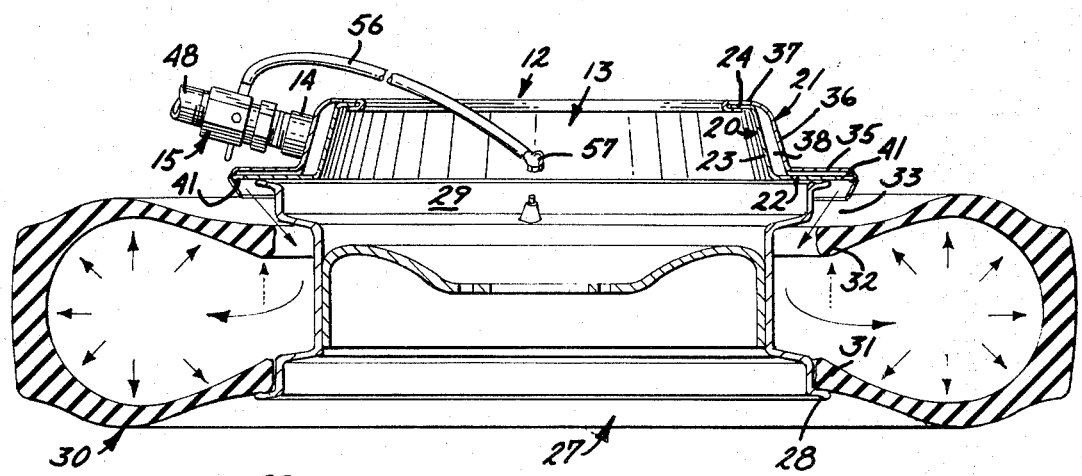
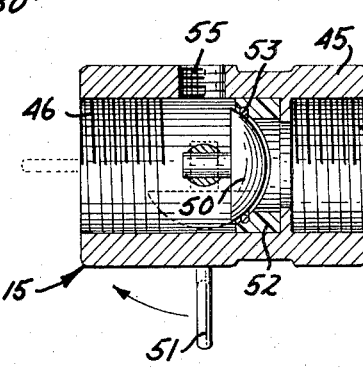
INVENTORS.
FELIX H. RUHLAND
RAYMOND H. SCHMIDT
BY
Merchant & Gould
ATTORNEYS

PATENTED AUG 15 1972 3,683,991

INVENTOR.
FELIX H. RUHLAND
RAYMOND H. SCHMIDT
BY
Merchant & Gould

ATTORNEYS 3,683,991

TIRE BEAD SEATER

BACKGROUND OF THE INVENTION

1. Field of the Invention

At the present time, tires utilized on automotive vehicles are generally tubeless. In the tubeless-type of tires the wheel has a pair of spaced apart rims which are designed to receive the beads of the tire in sealing engagement therewith. To inflate the tubeless tires it is first necessary to sealingly engage the bead of each side thereof with the rim of the wheel so that air within the tire cannot escape. Once the beads are properly seated on the rim of the wheel, air can be injected into the tire through the valve stem in the wheel and the tire can be inflated to the desired pressure.

Description of the Prior Art

In prior art devices, such as that described by Mueller in U.S. Pat. No. 3,461,938 and some embodiments of Corless in U.S. Pat. No. 3,552,469, the tire is positioned on the wheel so that the lower bead is in sealing engagement with the rim and a device is positioned on the rim so that a seal is formed completely around the rim and a second seal is formed with the side wall of the tire in spaced relation from the rim and completely therearound. Air is then injected into the tire between the two seals, until the tire is sufficiently inflated to seat the upper bead against the rim.

In one embodiment of the Corless patent, the tire is positioned on the rim with the lower bead seated and a space between the upper rim and bead. Air is then injected into the space between the rim and bead in a continuous ring. Corless theorizes that this continuous ring forms a barrier to prevent air from leaving the tire and the pressure within the tire rises sufficiently to seat the upper bead, whereupon air is immediately injected into the valve stem in the wheel to raise the pressure within the tire sufficiently to maintain the bead seated. The method and apparatus of Corless is somewhat unsatisfactory in that he must have a continuous ring of air to seat the bead properly and in one adjustable embodiment he describes nozzles angled in a fan-like manner to provide a continuous curtain of air.

SUMMARY OF THE INVENTION

The present invention pertains to apparatus for seating the bead of a tubeless tire on the rim of a wheel including a plenum having an inlet for receiving air under relatively high pressure and a plurality of jets in communication with said plenum positioned to inject relatively high velocity jets of air into a tire between the bead and the wheel over substantially less than 360°.

It is an object of the present invention to provide an improved tire bead seater.

It is a further object of the present invention to provide an improved tire bead seater which utilizes a plurality of high velocity jets of air to seat the bead rather than a continuous ring of air around the entire wheel.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in top plan of an embodiment of the tire bead seater, portions thereof broken away;

FIG. 2 is an enlarged sectional view as seen from the line 2—2 in FIG. 1, illustrating the tire bead seater in the operative position;

FIG. 3 is an enlarged sectional view as seen from the line 3—3 in FIG. 1;

FIG. 4 is a sectional view of the valve assembly for the tire bead seater in FIG. 1;

DESCRIPTION OF THE PREFERRED EMBODIMENTS

Figure 5:
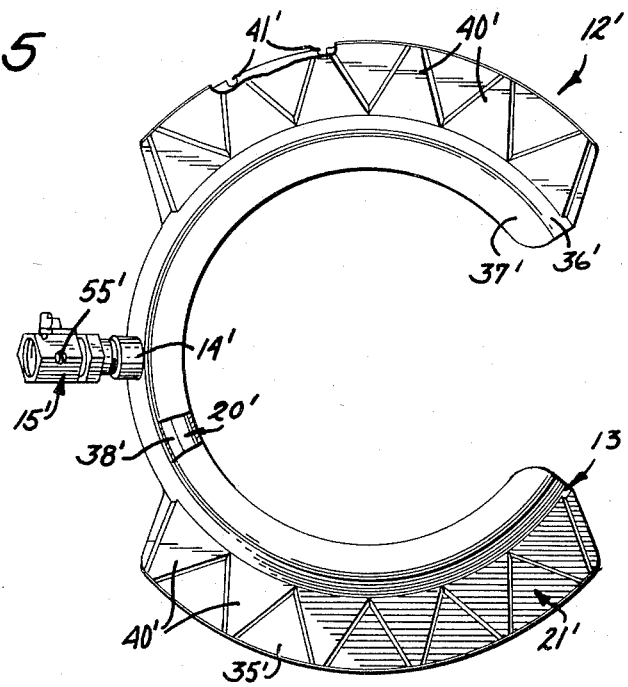
FIG. 5 is a view in top plan of another embodiment of the tire bead seater, portions thereof broken away.
Figure 6:
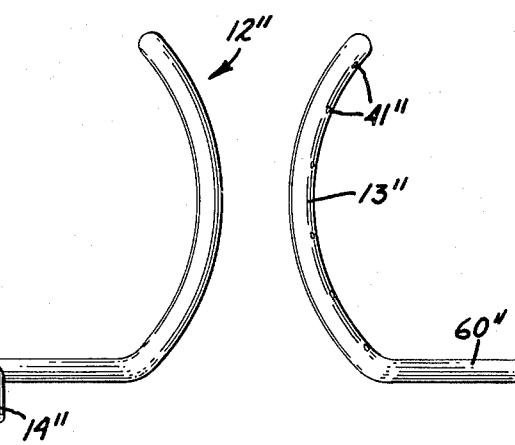
FIG. 6 is a view in top plan of another embodiment of the tire bead seater, portions thereof broken away.
Figure 7:
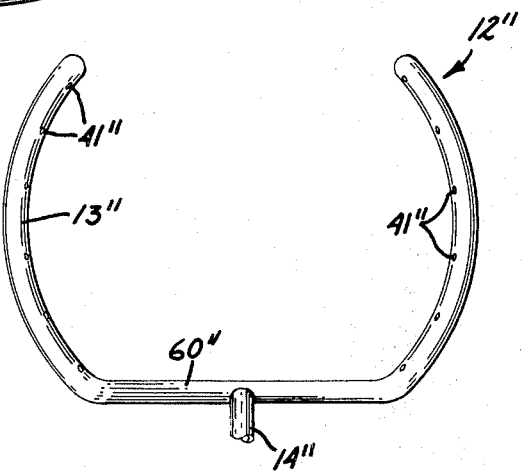
FIG. 7 is a view in bottom plan of the embodiment illustrated in FIG. 6.
Figure 9:
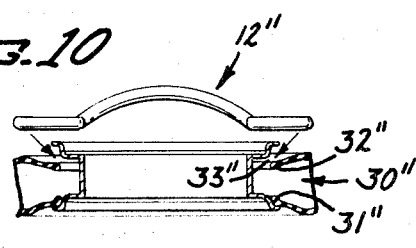
FIG. 9 is a view of the embodiment of the tire bead seater of FIG. 6 in operative position on a standard rim.
Figure 8:
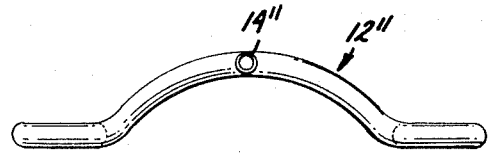
FIG. 8 is a view in side elevation of the embodiment illustrated in FIG. 6.

Referring to FIGS. 1 through 4, tire bead seating and inflating apparatus, generally designated 12, is illustrated. The tire bead seater 12 includes a housing 13 having an air inlet 14 with a valve assembly 15 attached thereto. The housing 13 is formed with a central opening 16 therethrough, in the present embodiment, which opening 16 is provided so that the tire bead seater 12 can be utilized with present tire mounting equipment. However, it should be understood that the opening 16 is not necessary to the operation of the tire bead seater 12.

The housing 13 is formed from first and second members 20 and 21 each of which is generally annularly shaped and each of which will be described relative to a cross section through a single side thereof. Further, in the following description of the members 20 and 21, the tire bead seater 12 is positioned generally horizontally in a normal operating position but it should be understood that in some instances it may be utilized in other positions and the references to directions, such as upper and lower, are simply for explanatory purposes.

One side of the member 20 has a generally Z-shaped cross section with a lower flat horizontal portion 22 extending generally radially outwardly, a central vertically extending portion 23 and an upper flat horizontal, radially inwardly extending portion 24. Referring to FIG. 2, a wheel 27 is illustrated having a lower rim 28 and an upper rim 29. A tire 30 is illustrated in position on the wheel 27 with a lower bead 31 properly seated in the lower rim 28 and an upper bead 32 spaced from the upper rim 29 to define an opening 33 into the tire 30 therebetween. The lower portion 22 of the member 20 is constructed with sufficient radial width to rest solidly on the upper rim 29 of the wheel 27.

The member 21 of the housing 13 is also formed with a generally Z-shaped cross section for one side thereof. A lower generally flat horizontal portion 35 is positioned in parallel juxtaposition to the upper surface of the portion 22 of the member 20. The portion 35 is radially outwardly extending and a central upwardly extending portion 36 is integrally formed with the inner edge thereof. The portion 36 is spaced from the upwardly extending portion 23 of the member 20 and is generally parallel therewith. An upper generally horizontal, radially inwardly extending portion 37 is integrally attached to the upper edge of the portion 36 and extends parallel with and in juxtaposition to the upper surface of the portion 24 of the member 20. The radially innermost edge of the portion 37 is bent approximately 180° to encircle the radially innermost edge of the portion 24 and the portions 24 and 37 are affixed together by some convenient means, such as spot welding or the like, to completely seal the entire juncture therebetween. Because the vertically extending portions 23 and 36 of the members 20 and 21 are spaced apart and the horizontal upper portions 24 and 37 are sealed while the horizontal lower portions 22 and 35 are in parallel juxtaposition, a chamber is defined between the members 20 and 21 which is utilized as a plenum 38.

The lower flat horizontal portion 35 of the member 21 has a plurality of generally wedge-shaped, radially extending inverted channels 40 formed therein in circumferentially spaced relationship. In the present embodiment, each of the channels 40 is formed by producing an upwardly directed wrinkle or corrugation in the material forming the portion 25 which corrugation increases in circumferential width as it progresses radially inwardly. Each upwardly directed wrinkle or corrugation defines a downwardly directed channel 40 and cooperates with the upwardly directed surface of the portion 22 of member 20 to define radially extending conduits in communication with the plenum 38. In the present embodiment there are 12 equally spaced channels 40 in the housing 13 and each of the channels 40 has a width of approximately 2 inches at the radially inner end and a width of approximately three-eighth inch at the radially outer end.

The outermost periphery of the portion 35 of the member 21 is rolled generally inwardly and downwardly around the outer edge of the portion 22 and angularly inwardly and downwardly therebelow. A generally semi-circularly shaped opening or jet 41 is formed in the outer edge of the portion 22 in communication with each of the channels 40 so that a jet of air emanating from each of the jets 41 is turned and directed generally inwardly and downwardly. Each of the jets 41 direct a jet of air into the opening 33 between the upper rim 29 of the wheel 27 and the upper bead 32 of the tire 30.

It has been found through a great amount or experimenting that the spacing or position of the various jets 41 around the circumference of the housing 13 is not critical and there is no necessity to space them equally or form a continuous curtain of air if the total volume and velocity of air supplied to the tire 30 by the plurality of jets 41 is sufficient. In the present embodiment, the outlet opening of each of the jets 41 is approximately semi-circular with a 3/16 inch diameter and the air supplied to the plenum 38 is under a line pressure in the range of approximately 85–150 pounds. In general, the lower air pressures are sufficient for thinner and more flexible tires while the higher line pressures are required as the upper bead 32 of the tire 30 must be moved further and the tire 30 is constructed thicker and less pliable. It should of course be understood that higher pressures might be utilized and, in such instances, it is believed that either jets having smaller orifices or smaller numbers of jets might be utilized but the described line pressures are compatible with equipment presently available in garages and tire changing shops.

The valve assembly 15 utilized with the air inlet 14 is constructed to apply air under pressure to the plenum 38 only at the desired times. Basically, the valve assembly 15 includes a tubular body 45 having an internally threaded inlet end 46 and an internally threaded outlet end 47. As illustrated in FIGS. 1 and 2, the outlet end 47 is threadedly engaged on the air inlet 14 of the housing 13 and a conduit 48, which is in communication with a supply of air under pressure, is threadedly engaged into the inlet end 46. Approximately midway between the inlet end 46 and the outlet end 47, a hemispherically shaped valve member 50 is internally affixed to an external handle 51 for pivotal movements therewith. The valve member 50 is further positioned for sliding engagement with a valve seat 52, which valve seat 52 has an O-ring 53 mounted therein for sealing engagement with the surface of the valve member 50. In operation, when the valve member 50 is rotated into the sealing position, as illustrated in FIG. 4, the pressure at the inlet side of the valve member 50 is greater than the pressure at the opposite side thereof and the valve member 50 is forced into tight sealing engagement with the valve seat 52 and O-ring 53. Upon rotation of the handle 51, the valve member 50 rotates into at least partial disengagement from the valve seat 52 and air is free to flow through the body 45. While a specific valve assembly 15 is illustrated for explanatory purposes, it should be understood that a variety of valve assemblies 15 might be utilized by those skilled in the art.

A transversely extending opening 55 is provided in the body 45 of the valve assembly 15 upstream or toward the inlet end 46 from the valve member 50. A short flexible conduit 56, having an adapter 57 at one end thereof, is engaged in the opening 55. The adapter 57 is constructed to mate with a valve stem 58 of the wheel 27. Thus, air can be supplied to the tire 30 through the valve stem 58, before, during, and/or after air is supplied to the plenum 38 for seating the upper bead 32 of the tire 30. This particular construction of the valve assembly 15, conduit 56 and adapter 57 greatly facilitates the overall operation of the tire bead seater and inflator.

Referring to FIG. 5, a second embodiment is illustrated wherein similar parts are designated with similar numbers and all of the numbers have a prime added to indicate a different embodiment. FIG. 5 illustrates a tire bead seater 12' wherein a housing 13' has a generally C-shaped configuration. The housing 13' has an air inlet 14' and valve assembly 15' similar to the air inlet 14 and valve assembly 15 of the previously described embodiment. In this embodiment the open portion of the C-shaped housing 13' is diametrically opposite the air inlet 14'. 12 channels 40' and jets 41' are formed in communication with the plenum 38' with six of the jets 41' being spaced apart in a 90° arcuate portion of the housing 13' adjacent one end thereof and the remaining six jets 41' being spaced apart over a 90° arcuate portion diametrically opposed thereto and adjacent the other end of the housing 13'. Thus, there are two arcuate portions of approximately 90° each, between the sets of jets 41' which do not contain any jets 41' or any other means of introducing air into a tire. In this embodiment the outlet openings of the jets 41' are approximately equal to the previously described openings and the air applied to the valve assembly 15' is under a line pressure approximately within the above described range. While the sets of six jets 41' are each spaced over an arcuate portion of approximately 90° in this embodiment, it should be understood that they might be situated more closely together or spaced further apart if desired.

Referring to FIGS. 6 through 10, another embodiment of the tire bead seater 12" is illustrated wherein similar parts are designated with similar numbers having a double prime added to indicate a different embodiment. A generally C-shaped housing 13" is simply constructed of tubular material in this embodiment with the ends thereof being sealed to prevent the egress of air therethrough. Substantially 90° arcuate portions adjacent each end of the housing 13" are oriented concentrically and in a common plane while an approximately 90° arcuate portion 60" adjoining the two end portions is oriented in upwardly arcing relationship to the common plane. An air inlet 14" is positioned approximately centrally in the upwardly arcing portion 60" of the housing 13". A plurality of jets 41" are formed in each of the arcuate portions adjacent the ends of the housing 13" simply by forming holes in the housing 13". The jets 41" are formed so that jets of air emanating therefrom are directed radially inwardly and downwardly (see FIG. 9) to enter an opening 33" between the upper rim 29" of a wheel 27" and the upper bead 32" of a tire 30". While the housing 13" is illustrated as a generally C-shaped structure in this embodiment, it should be understood that an annular housing might be utilized if desired but would add additional material and weight. In this embodiment the outlet openings of the jets 41" are formed with approximately a 3/16 inch diameter and the air pressure utilized within the plenum of the housing 13 is similar to that described above.

Figure 10:
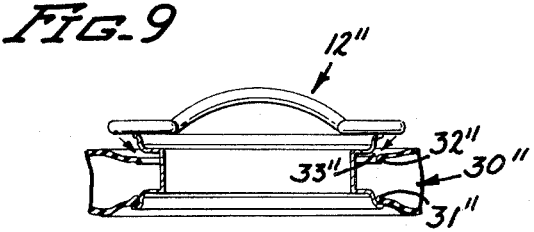
FIG. 10 is a view of the embodiment of the tire bead seater of FIG. 6 in operative position on a 13 inch rim.

In the operation of any of the three embodiments illustrated, it should be noted that each of the embodiments is designed to operate specifically on a standard 15 inch wheel by simply resting on the upper rim thereof. Other sizes of tires may be inflated and the beads properly seated by resting the tire bead seater on the upper rim of the wheel. However, it has been found that the tire bead seater is more efficient when operating on smaller diameter wheels if it is raised a slight distance from the upper rim during operation. Referring to FIG. 10 for example, the tire bead seater 12" is illustrated in operative position over a 13 inch wheel. It will be noted that the tire bead seater 12" is raised approximately one inch above the upper rim of the wheel so that air leaving the jets 41" enters the space between the upper rim and the upper bead more directly.

Thus, several embodiments of an improved tire bead seater and inflator have been disclosed. It is believed that the present tire bead seater operates better than prior art devices because it is capable of seating tires with heavier side walls and it is believed that it seats all tire more exactly. Further, the present tire bead seater can be constructed in a variety of configurations to suit different needs and for operation with a variety of presently available equipment. For example, the C-shaped configurations of two of the embodiments allow the tire bead seater to be utilized with standard wheel holding equipment having a tall center post without requiring the tire bead seater to be lifted over the center post each time it is used. Also, because a continuous curtain of air is not required and the jets can be located substantially anywhere around the rim, manufacturing tolerances are not as stringent. While we have shown and described specific embodiments of this invention, further modifications and improvements will occur to those skilled in the art. We desire it to be understood, therefore, that this invention is not limited to the particular forms shown and we intend to cover all modifications and improvements coming within the spirit and scope of this invention.

We claim:

1. Apparatus for seating the bead of a tubeless tire on the rim of a wheel and inflating the tire comprising:
   a. a plenum in the form of a discontinuous ring having an inlet for receiving air under relatively high pressure therein;
   b. a plurality of jets in communication with said plenum for forming relatively high velocity jets of air emanating from said plenum; and
   c. said jets being positioned for directing said jets of air into the tire between the rim and the bead.

2. Apparatus for seating the bead of a tubeless tire on the rim of a wheel and inflating the tire as set forth in claim 1 wherein the jets include radially outwardly extending conduits affixed at the inner ends in communication with the plenum.

3. Apparatus for seating the bead of a tubeless tire on the rim of a wheel and inflating the tire as set forth in claim 1 wherein valve means are affixed to the inlet of the plenum for controlling air supplied to said plenum and said valve means further including conduit means adapted to be affixed to the valve stem of the wheel for introducing air into the tire through the valve stem.

4. Apparatus for seating the bead of a tubeless tire on the rim of a wheel and inflating the tire as set forth in claim 2 wherein the plenum and conduits are integral and defined by a housing having first and second members spaced apart to define the plenum and conduits and fixedly engaged together therearound.

5. Apparatus for seating the bead of a tubeless tire on the rim of a wheel and inflating the tire as set forth in claim 4 wherein an outermost portion of the first member of the housing is bent downwardly and radially inwardly in outwardly spaced relation from the outer ends of the conduits for deflecting the jets of air into the tire between the rim and the bead.

6. Apparatus for seating the bead of a tubeless tire on the rim of a wheel and inflating the tire as set forth in claim 4 wherein the housing is constructed with two concentrically oriented arcuate portions of approximately 90° each joined by a communicating portion of the plenum.

7. Apparatus for seating the bead of a tubeless tire on the rim of a wheel and inflating the tire as set forth in claim 1 wherein the plenum is at least partially arcuate and the jets are in communication therewith over not more than two concentrically oriented arcuate portions of approximately 90° each.

8. Apparatus for seating the bead of a tubeless tire on the rim of a wheel and inflating the tire as set forth in claim 1 wherein at least 12 jets are included and each jet has an outlet opening at least equal to the area of a semi-circular hole of 3/16 inch diameter.

* * * * *

Notice of Adverse Decision in Interference

In Interference No. 98,216 involving Patent No. 3,683,991, F. H. Ruhland and R. H. Schmidt, IMPROVED TIRE BEAD SEATER, final judgment adverse to the patentees was rendered Nov. 27, 1973, as to claims 1, 7 and 8.

[*Official Gazette February 26, 1974.*]

Disclaimer 3,683,991.—*Felix H. Ruhland*, Osseo, and *Raymond H. Schmidt*, Buffalo, Minn. IMPROVED TIRE BEAD SEATER. Patent dated Aug. 15, 1972. Disclaimer filed Oct. 29, 1973, by the assignee, *Solar Industries, Inc.*

Hereby enters this disclaimer to claims 1–8 of said patent.

[*Official Gazette May 27, 1975.*]